No. 630,683. Patented Aug. 8, 1899.
E. GOBBE.
GAS APPARATUS.
(Application filed Dec. 23, 1897.)
(No Model.) 3 Sheets—Sheet 1.

Witnesses: Inventor:
Emile Gobbe
By James L. Norris

No. 630,683. Patented Aug. 8, 1899.
E. GOBBE.
GAS APPARATUS.
(Application filed Dec. 23, 1897.)
(No Model.) 3 Sheets—Sheet 3.

Witnesses:

Inventor:
Emile Gobbe
By James L. Norris
Atty.

UNITED STATES PATENT OFFICE.

EMILE GOBBE, OF JUMET, BELGIUM.

GAS APPARATUS.

SPECIFICATION forming part of Letters Patent No. 630,683, dated August 8, 1899.

Application filed December 23, 1897. Serial No. 663,221. (No model.)

*To all whom it may concern:*

Be it known that I, EMILE GOBBE, a subject of His Majesty the King of Belgium, residing at Jumet, Belgium, have invented certain new and useful Improvements in Gas-Producers, of which the following is a specification.

My invention relates to a gas-generating apparatus constructed to increase the yield of ammonia or sulfate of ammonia and facilitate its collection with the rich gas separated from the poor gas; and the invention consists in the combination and relative arrangement of the parts of a gas-making apparatus as hereinafter more particularly described and claimed.

The annexed drawings represent my improved gas-producer.

Figure 1:
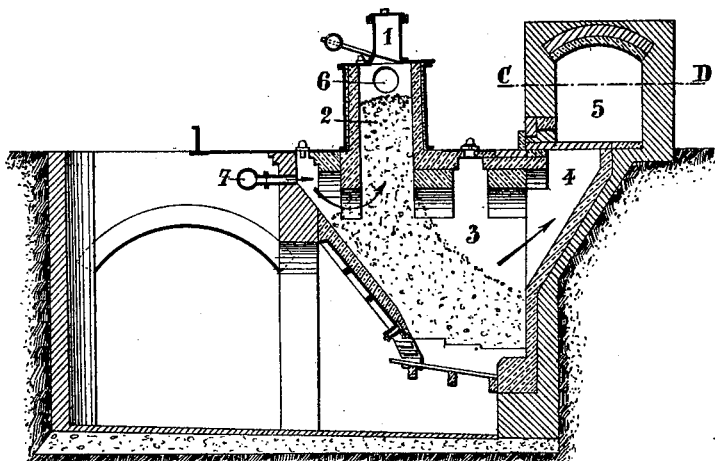
Figure 2:
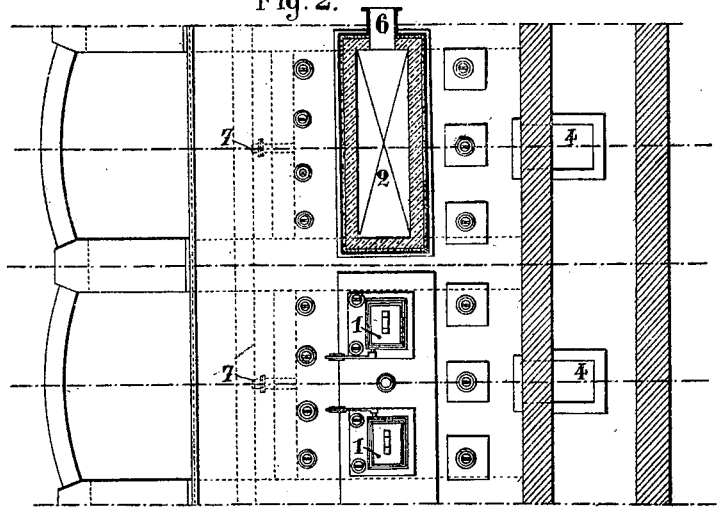
Figure 3:
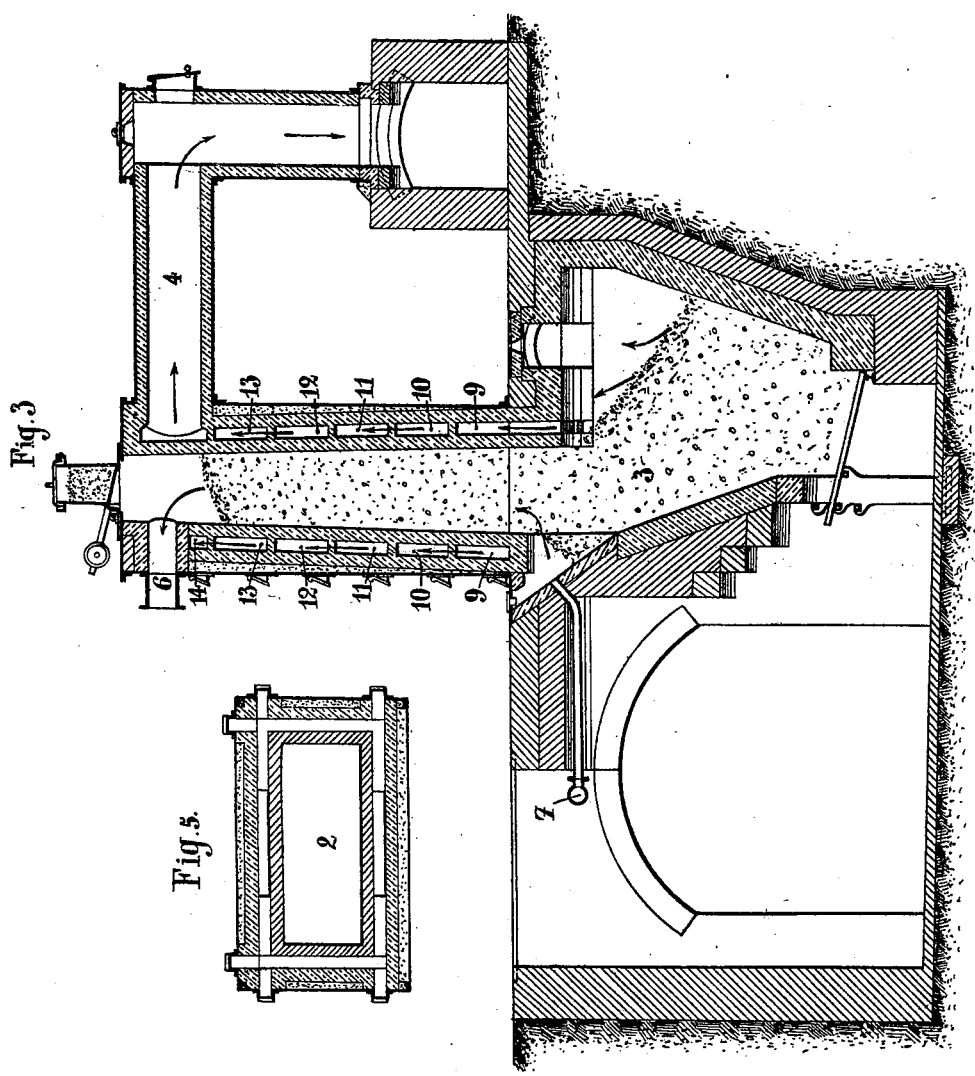
Figure 4:
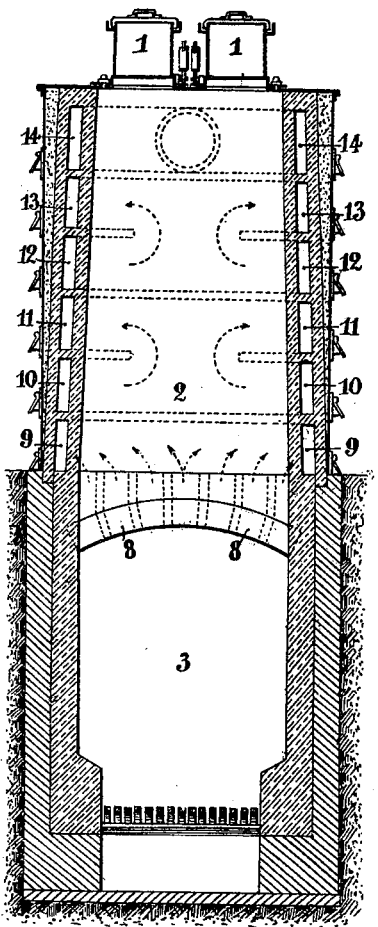

In the drawings, Figure 1 is a vertical section, and Fig. 2 partly a plan view and partly a section at line C D, of a common gas-producing apparatus which is modified according to my invention. Figs. 3 and 4 represent a modification of a gas-producer with separation of the rich gas and the poor gas. Fig. 5 is a sectional view of the feed-box of the apparatus which is illustrated in Figs. 3 and 4. This figure shows the disposition of the flues in which circulates the poor gas.

In the apparatus illustrated on Figs. 1 and 2 the fuel instead of being directly introduced into the furnace is first passed into the feed-box 1 and thence into a hopper 2, in which it is converted into coke before it passes into the gas-generator proper, 3. The carbonic oxid, poor in quality and comparatively hot, which is produced in the gas-generator proper, 3, passes through a channel 4 and collector 5, leading therefrom to any place of storage or utilization without undergoing any washing or cooling operation, whereas the rich and comparatively cold gas, containing all the hydrocarbons, all the ammonia, and little carbonic oxid, is sucked up by an extractor and passes through a special conduit 6, leading from the aforesaid hopper to the washing apparatus, in which the gas is deprived of its tar and its ammonia, and subsequently returns to the collector 5, where it is mixed with the poor gas and then passes, with the latter, to the place of storage or utilization. A steam-conduit 7 permits of wet steam being passed to the bottom of the hopper 2. This steam is sucked or drawn in by the extractor, which draws the rich gas through the aforesaid conduit 6, so that the said steam passes through the fuel contained in the hopper 2, where it is decomposed by contact with the hot fuel at the lower part of the hopper, and the yield of ammonia is considerably increased without the proper function of the gas-generator being interfered with, the grate of the said generator remaining open to the passage of air and free for removing the refuse.

In the apparatus shown in Figs. 3, 4, and 5 the hopper 2, in which the rich gas is produced, is above the properly-called "generator" 3, which contains only ignited coke and produces, consequently, only carbonic oxid, which is poor and very hot. The hopper 2 is made in the form of a vertical rectangular chimney or compartment slightly wider toward the base than at the top. It is filled with coal in the usual manner through the feed-box 1. This hopper is practically a vertical coke-furnace, in which the distillation of the fuel and its transformation into coke takes place before it passes into the generator 3. This coke-furnace 2 can be heated by the sensible heat of the poor gas, which leaves the gas-generator 3 through suitable openings 8 and passes successively through conduits 9 10 11 12 13 14, so as to come into contact with the whole exterior surface of the coke-furnace 2 before it reaches the conduit 4, which conveys it to the collector 5 and thence to the place of storage or utilization without undergoing a washing operation. The rich gas, which is produced in the coke-furnace part 2, is sucked up by an extractor, which communicates with the conduit 6 therefrom and compels it to first pass into a cooling apparatus and then into a washing apparatus (by which the tar and the ammonia are retained) before allowing it to mix with the poor gas in the main collector 5. A steam-conduit 7 likewise permits of the injection of wet steam into the ignited coke at the bottom of the coke-furnace part 2. This injection has for its object, as in the preceding arrangement, to increase the yield of ammonia through the action of the nascent hydrogen upon the nitrogen combined or not with the carbon, which is then set free from the coal.

Having now particularly described and ascertained the nature of my invention and in what manner the same is to be performed, I declare that what I claim is—

The combination with a gas-generator provided with a hopper or chamber for the introduction of fuel and its conversion into coke and having an exit for rich gas leading from the upper part of said hopper and an exit for poor gas leading from the generator at a point outside said hopper, of a steam-injecting device arranged for introduction of wet steam into the fuel at the bottom of the hopper to pass upward through the fuel in said hopper, thereby facilitating the union of nitrogen with nascent hydrogen and increasing the production of ammonia to pass off with the rich gas to a washer for subsequent separation and collection of the ammonia, substantially as described.

In testimony whereof I have hereunto set my hand in presence of two subscribing witnesses.

EMILE GOBBE.

Witnesses:
WM. SPUARD,
C. JÉMOIUS.